US012585416B2

(12) United States Patent
Oya

(10) Patent No.: US 12,585,416 B2
(45) Date of Patent: Mar. 24, 2026

(54) IMAGE PROCESSING APPARATUS, CONTROL METHOD OF IMAGE PROCESSING APPARATUS, AND STORAGE MEDIUM

(71) Applicant: CANON KABUSHIKI KAISHA, Tokyo (JP)

(72) Inventor: Hiroshi Oya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 203 days.

(21) Appl. No.: 18/516,308

(22) Filed: Nov. 21, 2023

(65) Prior Publication Data

US 2024/0176570 A1     May 30, 2024

(30) Foreign Application Priority Data

Nov. 28, 2022    (JP) ................................. 2022-188902

(51) Int. Cl.
*G06F 3/14*          (2006.01)
*H04N 1/00*          (2006.01)

(52) U.S. Cl.
CPC ....... *G06F 3/1423* (2013.01); *H04N 1/00477* (2013.01)

(58) Field of Classification Search
None
See application file for complete search history.

(56) References Cited

U.S. PATENT DOCUMENTS

2021/0383088 A1* 12/2021 Nakayama ........... G06K 7/1491
2022/0129084 A1*  4/2022 Konishi ............. G06F 3/04895
2023/0154212 A1*  5/2023 Zhang ....................... G06T 7/70
                                                        382/181

FOREIGN PATENT DOCUMENTS

JP          2010021938 A     1/2010

* cited by examiner

*Primary Examiner* — Darryl V Dottin
(74) *Attorney, Agent, or Firm* — Canon U.S.A., Inc. IP Division

(57)          ABSTRACT

An image processing apparatus includes a display unit configured to display a plurality of displays including a first display displayed based on a state of the image processing apparatus being a first state, the first display including a predetermined code, and a second display displayed based on a state of the image processing apparatus being a second state, the second display not including the predetermined code, the plurality of displays being automatically switched in order, and a display control unit configured to control the display unit in such a manner that the first display is displayed longer than the second display among the plurality of displays.

19 Claims, 13 Drawing Sheets

WARNING MSG MANAGEMENT INFORMATION

| WARNING TYPE | MSG_ID1 | MSG_ID2 | MSG_ID3 |
|---|---|---|---|
| LOW CARTRIDGE REMAINING AMOUNT | 123 | 456 | 789 |
| INVALID CARTRIDGE | 1234 | - | - |
| COPYING | 345 | - | - |

FIG. 6

MSG DETAILED INFORMATION　600

| MSG_ID 601 | MSG 602 | QR CODE DISPLAY NECESSITY 603 | DETAILED CONDITION 604 | URL 605 |
|---|---|---|---|---|
| 123 | PREPARE CARTRIDGE | DISPLAY | - | [IPAddress]/device_top.html |
| 456 | CHECK CONSUMABLES REPORT: HOLD DOWN HOME KEY | NOT DISPLAY | - | - |
| 789 | CARTRIDGE DELIVERY SERVICE IS AVAILABLE | DISPLAY WITH CONDITION | WHEN USER HAS NO CONTRACT FOR CARTRIDGE DELIVERY SERVICE | https://tonerDeliver/co.jp |
| 1234 | CARTRIDGE OTHER THAN CARTRIDGE DESIGNATED FOR THIS APPARATUS IS ATTACHED (CONTACT DISTRIBUTOR OR SERVICE PROVIDER) | DISPLAY WITH CONDITION | IN CASE WHERE SERVICE MODE: SERVICE_SW1=1 | https://Service/co.jp |
| 345 | NOW COPYING | NOT DISPLAY | - | - |

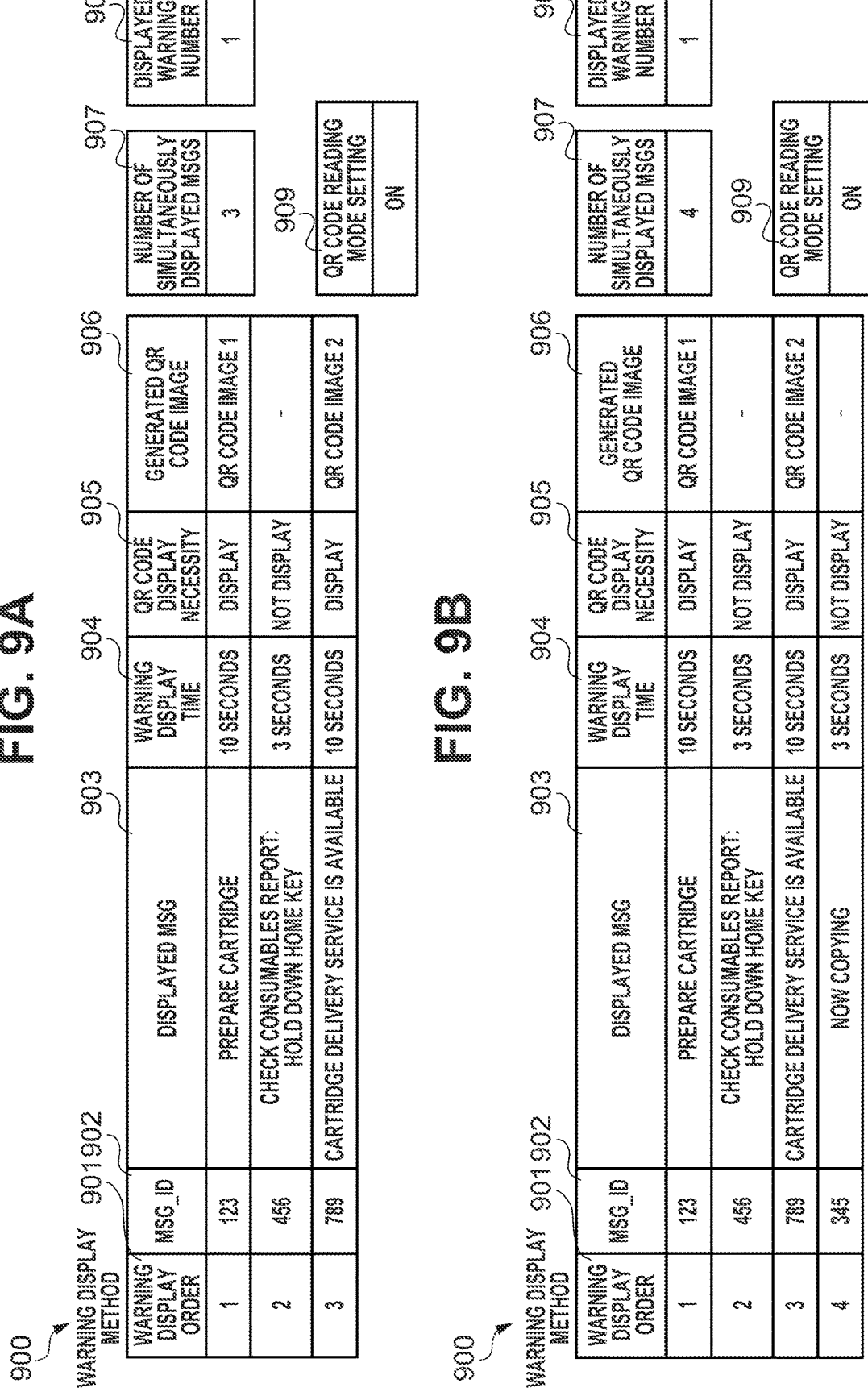

FIG. 9A

WARNING DISPLAY METHOD 900

901 902 903 904 905 906

| WARNING DISPLAY ORDER | MSG_ID | DISPLAYED MSG | WARNING DISPLAY TIME | QR CODE DISPLAY NECESSITY | GENERATED QR CODE IMAGE |
|---|---|---|---|---|---|
| 1 | 123 | PREPARE CARTRIDGE | 10 SECONDS | DISPLAY | QR CODE IMAGE 1 |
| 2 | 456 | CHECK CONSUMABLES REPORT: HOLD DOWN HOME KEY | 3 SECONDS | NOT DISPLAY | - |
| 3 | 789 | CARTRIDGE DELIVERY SERVICE IS AVAILABLE | 10 SECONDS | DISPLAY | QR CODE IMAGE 2 |

907

| NUMBER OF SIMULTANEOUSLY DISPLAYED MSGS |
|---|
| 3 |

908

| DISPLAYED WARNING NUMBER |
|---|
| 1 |

909

| QR CODE READING MODE SETTING |
|---|
| ON |

FIG. 9B

WARNING DISPLAY METHOD 900

901 902 903 904 905 906

| WARNING DISPLAY ORDER | MSG_ID | DISPLAYED MSG | WARNING DISPLAY TIME | QR CODE DISPLAY NECESSITY | GENERATED QR CODE IMAGE |
|---|---|---|---|---|---|
| 1 | 123 | PREPARE CARTRIDGE | 10 SECONDS | DISPLAY | QR CODE IMAGE 1 |
| 2 | 456 | CHECK CONSUMABLES REPORT: HOLD DOWN HOME KEY | 3 SECONDS | NOT DISPLAY | - |
| 3 | 789 | CARTRIDGE DELIVERY SERVICE IS AVAILABLE | 10 SECONDS | DISPLAY | QR CODE IMAGE 2 |
| 4 | 345 | NOW COPYING | 3 SECONDS | NOT DISPLAY | - |

907

| NUMBER OF SIMULTANEOUSLY DISPLAYED MSGS |
|---|
| 4 |

908

| DISPLAYED WARNING NUMBER |
|---|
| 1 |

909

| QR CODE READING MODE SETTING |
|---|
| ON |

FIG. 13

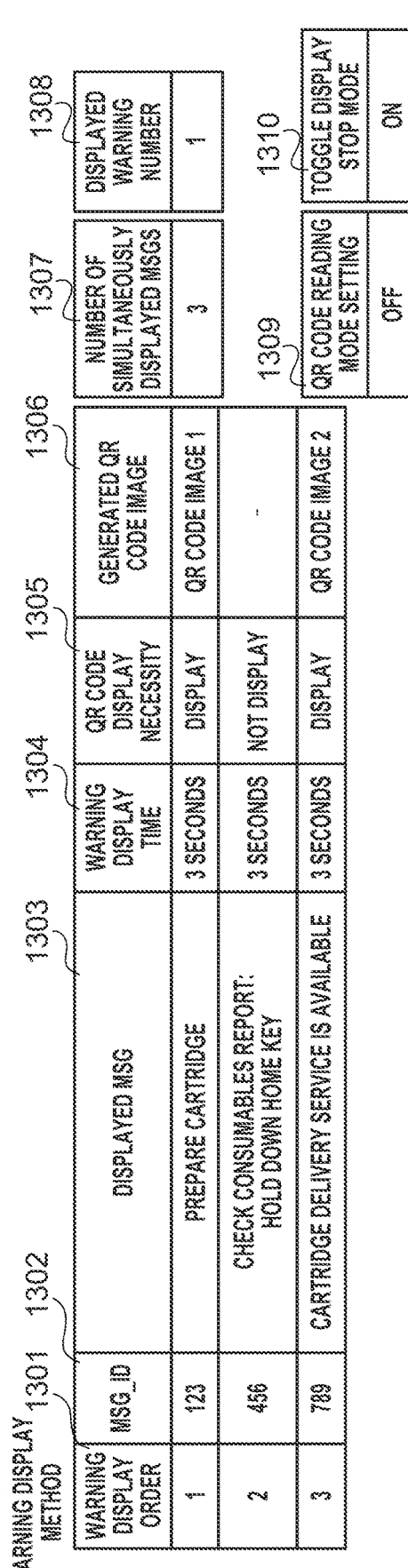

WARNING DISPLAY METHOD 1300

| WARNING DISPLAY ORDER | MSG_ID 1301 | DISPLAYED MSG 1302/1303 | WARNING DISPLAY TIME 1304 | QR CODE DISPLAY NECESSITY 1305 | GENERATED QR CODE IMAGE 1306 |
|---|---|---|---|---|---|
| 1 | 123 | PREPARE CARTRIDGE | 3 SECONDS | DISPLAY | QR CODE IMAGE 1 |
| 2 | 456 | CHECK CONSUMABLES REPORT: HOLD DOWN HOME KEY | 3 SECONDS | NOT DISPLAY | - |
| 3 | 789 | CARTRIDGE DELIVERY SERVICE IS AVAILABLE | 3 SECONDS | DISPLAY | QR CODE IMAGE 2 |

| NUMBER OF SIMULTANEOUSLY DISPLAYED MSGS 1307 | DISPLAYED WARNING NUMBER 1308 |
|---|---|
| 3 | 1 |

| QR CODE READING MODE SETTING 1309 | TOGGLE DISPLAY STOP MODE 1310 |
|---|---|
| OFF | ON |

IMAGE PROCESSING APPARATUS, CONTROL METHOD OF IMAGE PROCESSING APPARATUS, AND STORAGE MEDIUM

BACKGROUND

Field

The present disclosure related to an image processing apparatus, a control method of an image processing apparatus, and a storage medium.

Description of the Related Art

There has been known a method (hereinafter, will be referred to as toggle display) of displaying a plurality of display contents on a screen of an apparatus, such as a smartphone or a multifunction peripheral, while switching the display contents every predetermined time.

Japanese Patent Application Laid-Open No. 2010-21938 discusses a technique of executing toggle display of a plurality of messages indicating states of an apparatus.

In an apparatus in which a display region of a screen is limited as described above, an amount of displayable information has limitation. Thus, detailed information or reference information that has a large information amount is sometimes displayed as link destination information (uniform resource locator (URL)) that is accessible via the Internet.

The link destination information is sometimes displayed as a predetermined code, such as a one-dimensional code (barcode, etc.) or a two-dimensional code (QR code, etc.). A user reads the displayed predetermined code using a camera of an information terminal. By analyzing the predetermined code using analytical software of the information terminal, the information terminal can access the link destination information.

In a case where a plurality of displays is automatically switched in order, there is a case where a predetermined code is desired to be included in a certain display among the plurality of displays. For example, there is a case where, in a state in which an error A and an error B have simultaneously occurred in an image processing apparatus, messages respectively indicating the two errors are switched and displayed in order. Then, a URL by which the user can browse detailed information, such as an error cancellation method, is sometimes desired to be displayed using a predetermined code simultaneously with the message of the error A.

In such a case, when the user reads the predetermined code using a camera of an information terminal, if the display switches quite quickly, it becomes difficult for the user to read the predetermined code.

SUMMARY

The present disclosure is directed to making a predetermined code easily readable when a plurality of displays is automatically switched and displayed in order.

According to an aspect of the present disclosure, an image processing apparatus includes a display unit configured to display a plurality of displays including a first display displayed based on a state of the image processing apparatus being a first state, the first display including a predetermined code, and a second display displayed based on a state of the image processing apparatus being a second state, the second display not including the predetermined code, the plurality of displays being automatically switched in order, and a display control unit configured to control the display unit in such a manner that the first display is displayed longer than the second display among the plurality of displays.

Further features of the present disclosure will become apparent from the following description of exemplary embodiments with reference to the attached drawings.

BRIEF DESCRIPTION OF THE DRAWINGS

FIG. 6 is a diagram illustrating an example of MSG detailed information according to the first exemplary embodiment.

FIGS. 9A and 9B are diagrams each illustrating an example of a warning display method according to the first exemplary embodiment.

FIG. 13 is a diagram illustrating an example of a warning display method according to the first exemplary embodiment.

DESCRIPTION OF THE EMBODIMENTS

Hereinafter, exemplary embodiments of the present disclosure will be described in detail with reference to the drawings. The following exemplary embodiments are not intended to limit the disclosure set forth in the appended claims. In addition, not all the combinations of features described in the exemplary embodiments are always essential to the solution of the disclosure.

A first exemplary embodiment of the present disclosure will be described.

Figure 1:
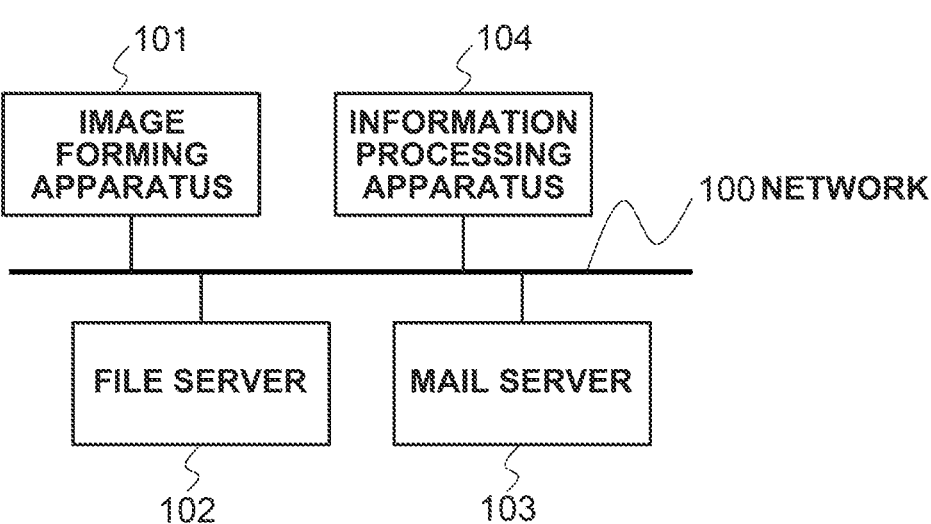
FIG. 1 is a diagram illustrating an example of a system configuration according to an exemplary embodiment of the present disclosure.

FIG. 1 is a diagram illustrating an example of a system configuration according to an exemplary embodiment of the present disclosure. An image processing system according to the present exemplary embodiment includes an image forming apparatus 101, a file server 102, a mail server 103, and an information processing apparatus 104, which are communicably connected with each other via a network 100.

The image forming apparatus 101 is an example of an image processing apparatus. The image forming apparatus 101 has a scan function of generating image data indicating an image on a document by reading the document, and a print function of printing an image on a sheet based on image data. In addition, the image forming apparatus 101 has a copy function of generating image data indicating an image on a document by reading the document, and printing the image on a sheet based on the generated image data.

The file server 102 is a server conforming to protocols such as a file transfer protocol (FTP) and a Server Message Block (SMB).

The mail server 103 is a server conforming to a Simple Mail Transfer Protocol (SMTP).

The image forming apparatus 101 can transmit image data generated by reading a document to the file server 102. The file server 102 receives and stores the image data transmitted from the image forming apparatus 101. It is possible to refer to the stored image data from the information processing apparatus 104.

In addition, the image forming apparatus 101 can attach image data generated by reading a document to an e-mail, set a destination, and transmit the e-mail to the mail server 103. The mail server 103 transfers the e-mail transmitted from the image forming apparatus 101 to the destination set by the image forming apparatus 101.

The information processing apparatus 104 is a smartphone or a personal computer (PC), for example. Using the HyperText Transfer Protocol (HTTP), the information processing apparatus 104 refers to and changes a setting value of the image forming apparatus 101. Using the HTTP, the information processing apparatus 104 can also refer to a state, such as an error, of the image forming apparatus 101.

The network 100 is used for transmission and reception of various types of data, such as image data and commands. The network 100 may be a wired network or a wireless network.

In a case where the information processing apparatus 104 is a smartphone, a wireless network is mainly used as the network 100.

Image data according to the present exemplary embodiment is electronic data. Specifically, the image data may be RAW data, may be electronic data in an image format such as Tag Image File Format (TIFF), or Joint Photographic Experts Group (JPEG), or electronic data in Portable Document Format (PDF).

Figure 2:
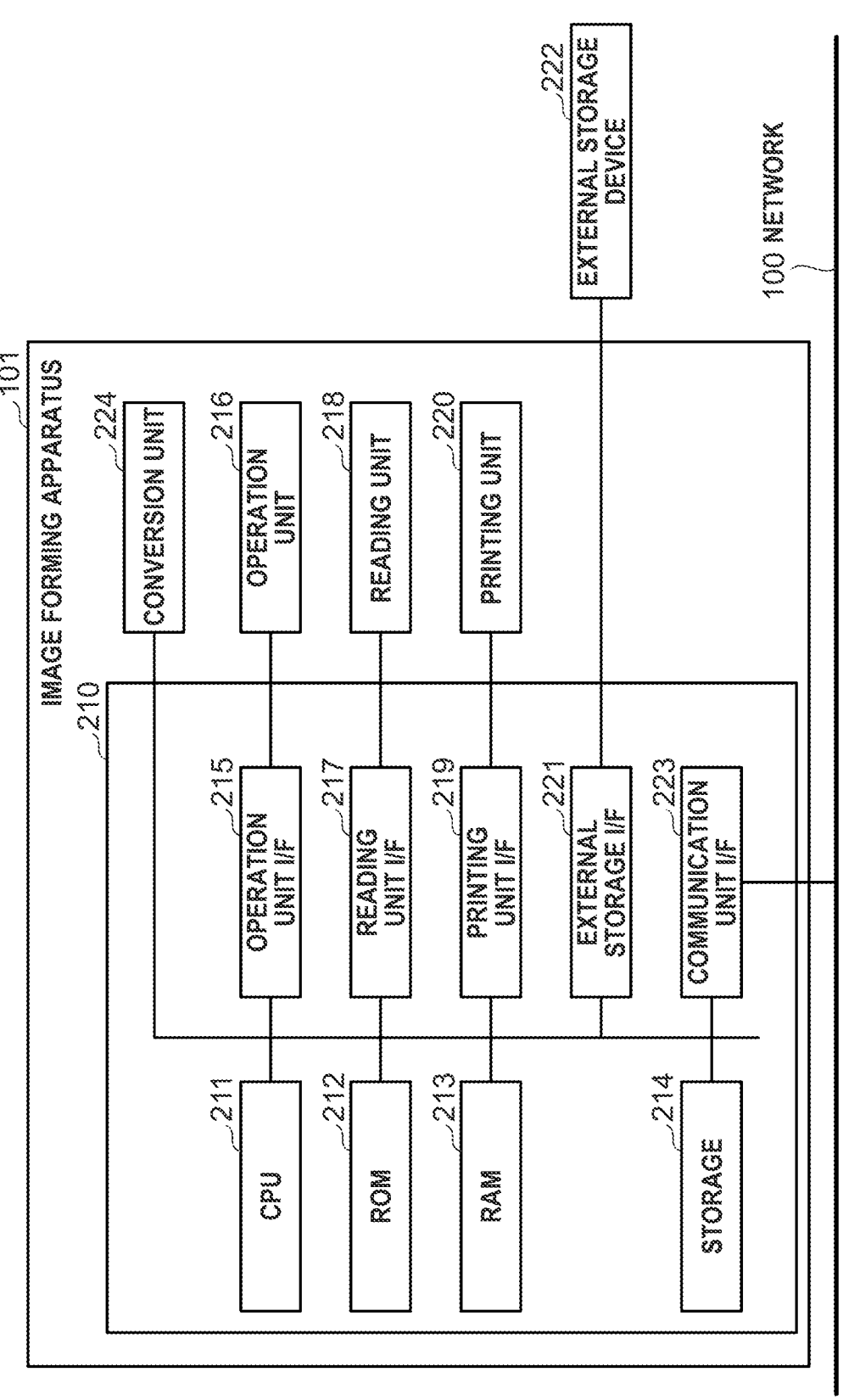
FIG. 2 is a block diagram illustrating an example of a configuration of an image forming apparatus according to an exemplary embodiment of the present disclosure.

FIG. 2 is a block diagram illustrating an example of a configuration of the image forming apparatus 101.

A control unit 210 including a central processing unit (CPU) 211 controls an operation of the entire image forming apparatus 101.

The CPU 211 performs various types of control, such as reading control and printing control, by loading programs stored in a read-only memory (ROM) 212 or a storage 214 into a random access memory (RAM) 213 and executing the programs.

The ROM 212 stores programs executable by the CPU 211. Aside from control programs, the ROM 212 stores various programs, such as boot programs and font data.

The RAM 213 is a main storage memory of the CPU 211. The RAM 213 is used as a work area and as a temporary storage area for loading the various programs stored in the ROM 212 and the storage 214.

The storage 214 stores image data, print data, an address book, various programs, and various types of setting information. In the present exemplary embodiment, the storage 214 is described as a flash memory, but an auxiliary storage device, such as a solid state drive (SSD), a hard disk drive (HDD), or an embedded MultiMediaCard (eMMC), may be used.

In the image forming apparatus 101, one CPU 211 uses one memory (the RAM 213) to execute each piece of processing illustrated in a flowchart to be described below, but another configuration may be employed. For example, it is also possible to use a plurality of CPUs, RAMs, ROMs, and storages in cooperation to execute each piece of processing illustrated in a flowchart to be described below. In addition, part of processing may be executed using a hardware circuit, such as an application specific integrated circuit (ASIC) or a Field Programmable Gate Array (FPGA).

An operation unit interface (I/F) 215 connects an operation unit 216 and the control unit 210.

The operation unit 216 includes a touch panel display including a touch panel sheet attached to a liquid crystal display. The liquid crystal display has a function of displaying information to a user.

The operation unit 216 also receives input made by the user via the touch panel display or hardware keys.

A reading unit I/F 217 connects a reading unit 218 and the control unit 210.

The reading unit 218 generates image data by reading an image on a document. The generated image data is stored in the storage 214. Then, the CPU 211 determines whether the image data includes a QR code (an example of a two-dimensional code). Then, in a case where the CPU 211 determines that the image data includes a QR code, the CPU 211 causes a conversion unit 224 to convert the QR code into a character string.

Furthermore, the CPU 211 performs encryption and image processing on the generated image data in accordance with a setting set at the time of reading the image. The image data generated through various types of processing is stored in the storage 214. After that, the image data is transmitted to the file server 102 or the like, stored in an external storage device 222, or printed on a sheet by a printing unit 220. The reading unit 218 also notifies the CPU 211 of state information regarding the reading unit 218 including a reading operation status and error information, and the CPU 211 stores the information in the RAM 213.

A printing unit I/F 219 connects the printing unit 220 and the control unit 210. The CPU 211 transmits image data to be printed (print target image data) to the printing unit 220 via the printing unit I/F 219.

The printing unit 220 prints an image on a sheet fed from a sheet feeding cassette (not illustrated) based on image data transmitted via the printing unit I/F 219. The printing unit 220 also notifies the CPU 211 of state information regarding the printing unit 220 including a printing operation status and error information, and the CPU 211 stores the information in the RAM 213.

An external storage I/F 221 connects the external storage device 222 and the control unit 210. The CPU 211 stores image data in the external storage device 222 via the external storage I/F 221.

In the present exemplary embodiment, the external storage I/F 221 is described as a universal serial bus (USB) interface, and the external storage device 222 is described as a USB memory. Nevertheless, a secure digital (SD) card or the like may be used as the external storage device 222. In a case where an SD card is used, an SD card I/F is used as the external storage I/F 221.

The control unit 210 is connected to the network 100 via a communication unit I/F 223.

The communication unit I/F 223 can execute transmission of image data to the file server 102, transmission of an e-mail to the mail server 103, and transmission of various types of information inside the apparatus to the information processing apparatus 104. The various types of information inside the apparatus refer to setting information regarding operation of the image forming apparatus 101 and state information including an operation status and error information of the image forming apparatus 101.

The communication unit I/F 223 receives, from the information processing apparatus 104, a reference request of various types of information inside the apparatus and a change request of setting information. When the reference request of various types of information is received, the CPU 211 reads various types of information from the storage 214. When the change request of setting information is received, the CPU 211 changes the setting information. The file transmission of image data is performed using a protocol such as FTP and SMB, and the transmission of an e-mail is performed using a protocol such as SMTP. The transmission of various types of information to the information processing apparatus 104 and the reception of the change request of setting information from the information processing apparatus 104 are performed using HTTP. The image forming apparatus 101 includes a web server application, and the CPU 211 performs the reception of various types of information from the information processing apparatus 104 and the reception of the change request of setting information via the web server application.

The conversion unit 224 analyzes a QR code designated by the CPU 211 and converts the QR code into character string information. In contrast, the conversion unit 224 converts character string information designated by the CPU 211 into a QR code. Form of information included in a QR code includes numbers, alphabets, and binary data. Examples of content of information included in a QR code include a uniform resource locator (URL) starting from "http" and data including a key and a value. The size of a QR code is not specifically limited as long as a standard is satisfied. In the present exemplary embodiment, QR code conversion in the conversion unit 224 is described as being executed using dedicated hardware, but a configuration where the QR code through software processing may be employed.

Figure 3:
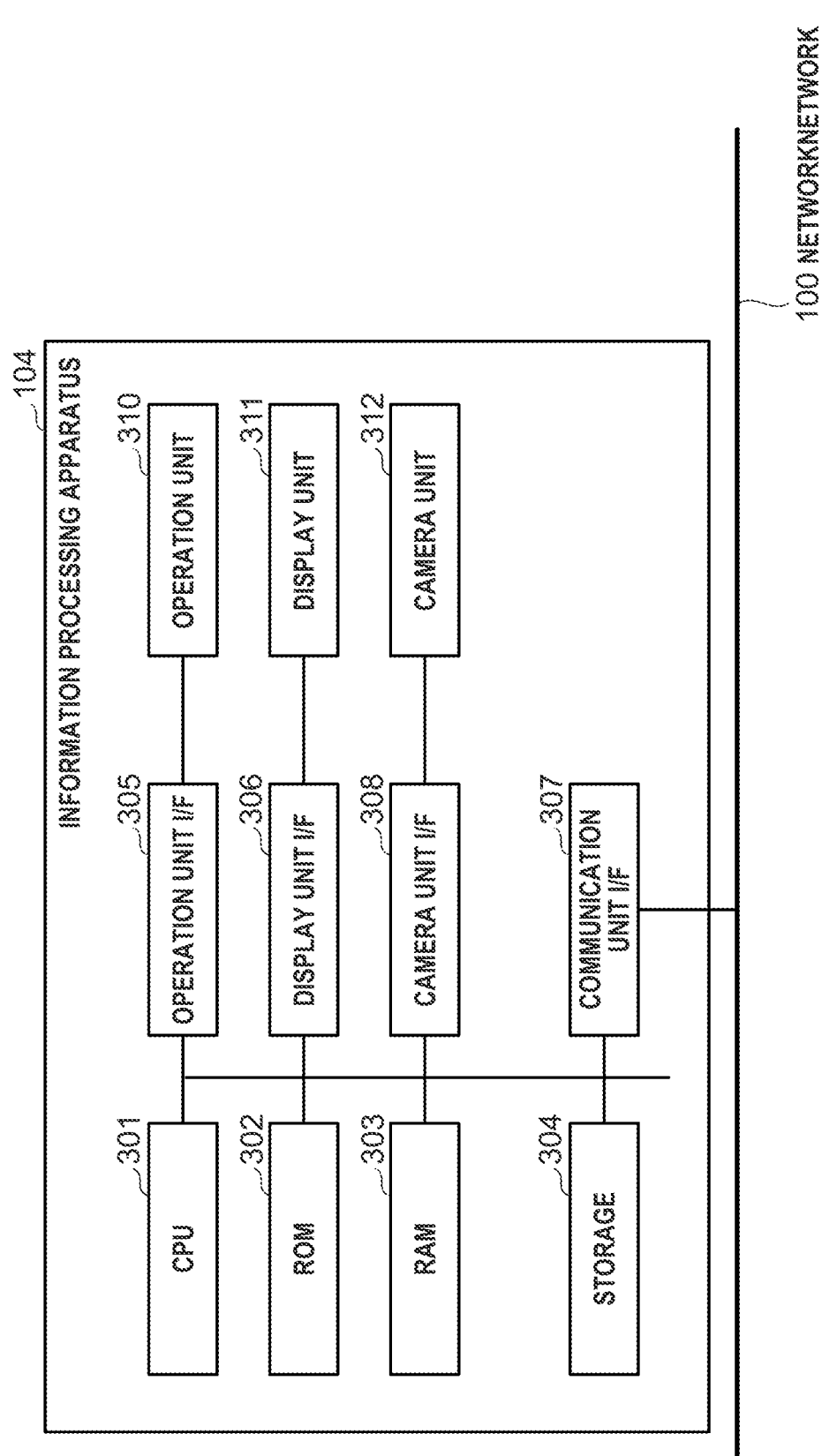
FIG. 3 is a block diagram illustrating an example of a configuration of an information processing apparatus according to an exemplary embodiment of the present disclosure.

FIG. 3 is a block diagram illustrating an example of a configuration of the information processing apparatus 104.

The information processing apparatus 104 includes a CPU 301, a ROM 302, a RAM 303, a storage 304, an operation unit I/F 305, a display unit I/F 306, a communication unit I/F 307, a camera unit I/F 308, an operation unit 310, a display unit 311, and a camera unit 312.

The CPU 301 controls the various hardware components 302 to 312 included in the information processing apparatus 104 in accordance with control programs stored in the ROM 302 to implement functions included in the information processing apparatus 104.

The CPU 301 transmits signals to the various hardware components 302 to 312 via a bus line to perform data communication with other hardware components. More specifically, the CPU 301 executes an operating system (OS) that controls the information processing apparatus 104.

Then, by application programs arranged on the OS operating on each other, the operation and control of a function desired by the user are performed.

The OS and various programs are stored in the ROM 302 and executed by being loaded into the RAM 303.

The ROM 302 is a memory for storing programs and various types of data that are to be used by the CPU 301.

The RAM 303 is a work memory for temporarily storing programs and data to be used by the CPU 301 for calculation.

The storage 304 is a storage device that stores various types of data and various programs. In the present exemplary embodiment, the storage 304 is described as a hard disk, but the storage 304 may be another nonvolatile storage device, such as an SSD.

The operation unit I/F 305 is an I/F for connecting the operation unit 310, such as a touch panel, and the information processing apparatus 104.

The display unit I/F 306 is an I/F for connecting the display unit 311, such as a liquid crystal display, and the information processing apparatus 104.

The communication unit I/F 307 is a network I/F for performing wireless local area network (LAN) communication, for example. An example in which the communication unit I/F 307 is a wireless communication I/F will be described. Nevertheless, the communication unit I/F 307 is not limited thereto, and may be a wired communication I/F. In a case where the communication unit I/F 307 is a wired communication I/F, wired LAN communication such as Ethernet is used.

The camera unit I/F 308 is an I/F for connecting the camera unit 312, such as a built-in camera, and the information processing apparatus 104.

Because the information processing apparatus 104 is described as a smartphone in the present exemplary embodiment, FIG. 3 illustrates a configuration in which the operation unit 310, the display unit 311, and the camera unit 312 are included in the information processing apparatus 104. In a case where the information processing apparatus 104 is a PC or the like, the configuration may be a configuration in which the operation unit 310, the display unit 311, and the camera unit 312 are not included in the information processing apparatus 104. In such a case, the present disclosure is also applicable.

Figure 4:
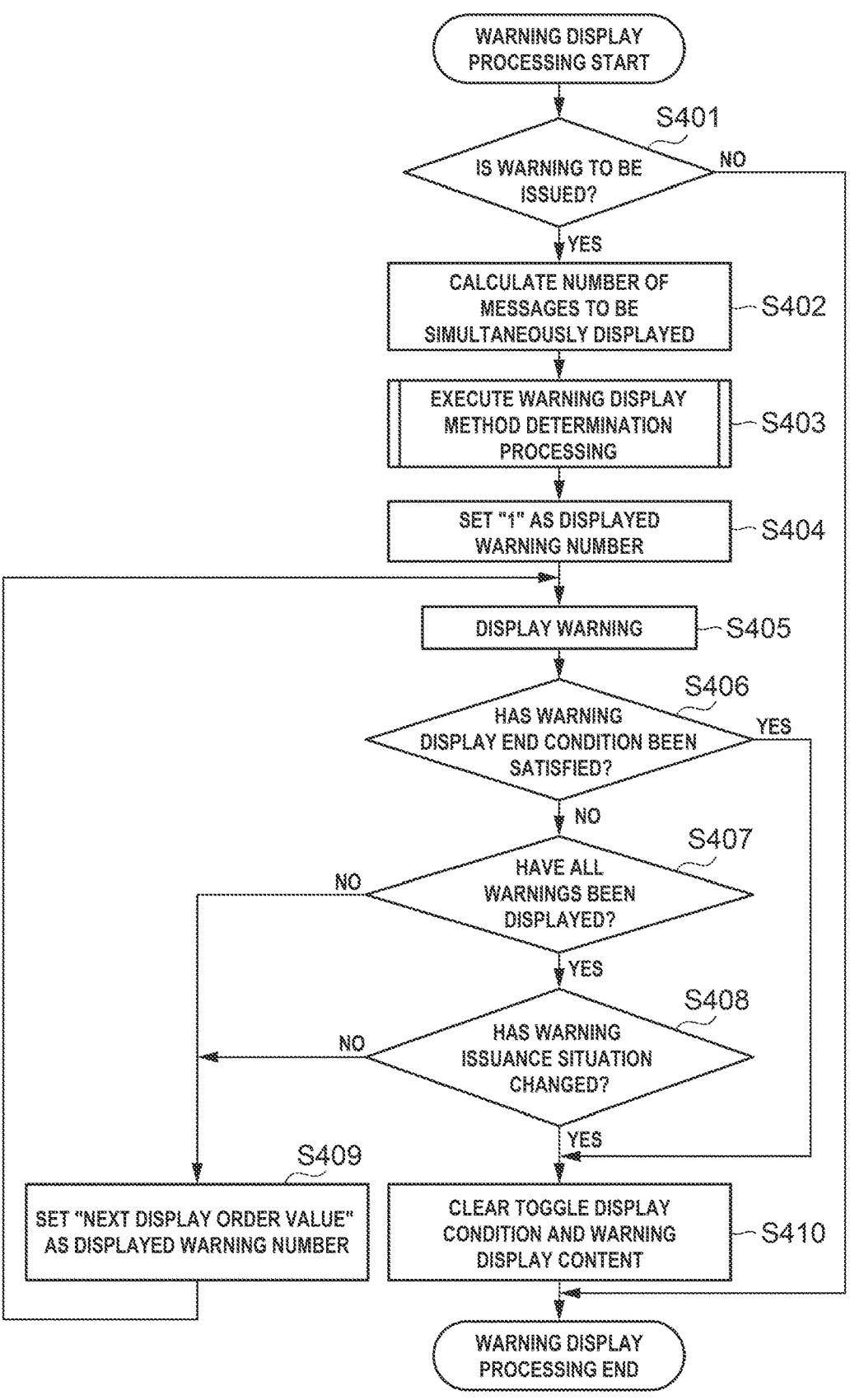
FIG. 4 is a flowchart illustrating a procedure of processing of displaying a warning on an operation unit of an image forming apparatus according to a first exemplary embodiment.

FIG. 4 is a flowchart illustrating a procedure of processing of warning display on the operation unit 216 of the image forming apparatus 101 according to the present exemplary embodiment. The processing illustrated in the flowchart in FIG. 4 is implemented by the CPU 211 loading a program stored in the ROM 212 or the storage 214 into the RAM 213 and executing the program.

In step S401, the CPU 211 acquires setting information and state information transmitted from the reading unit 218 and setting information and state information transmitted from the printing unit 220, and determines whether a state in which a warning is to be issued to the user has occurred based on the acquired information. Here, the warning includes a warning indicating a state in which a remaining amount of consumables used in the printing unit 220 has fallen below a predetermined threshold value, and a warning indicating a state in which an amount of staples in a stapler of a stapling unit (not illustrated) for printed sheets has fallen below a predetermined amount, for example. In the present exemplary embodiment, the description will be given of a case where a warning is issued. Alternatively, a status notification of an image forming apparatus, such as an in-execution notification indicating that copy is currently being executed, may be issued.

In a case where it is determined in step S401 that a state in which a warning is to be issued to the user has not occurred (NO in step S401), the CPU 211 ends the processing illustrated in the flowchart in FIG. 4.

Even if the processing illustrated in the flowchart in FIG. 4 ends once, as long as a screen displayed on the operation unit 216 is a screen that can display a warning, the CPU 211 executes a process in step S401 again after the lapse of a predetermined time. The predetermined time is set to one second, for example.

In a case where it is determined in step S401 that a state in which a warning is to be issued to the user has occurred (YES in step S401), the CPU 211 advances the processing to step S402.

In step S402, the CPU 211 calculates the number of warning messages (MSGs) to be simultaneously displayed. The number of MSGs corresponding to one warning is not limited to one due to restriction on a screen size. In some cases, an MSG is divided into a plurality of MSGs, and the plurality of MSGs is switched and displayed. In the present exemplary embodiment, an MSG to be displayed when each warning is issued is stored in the storage 214 as warning MSG management information 500.

Figure 5:
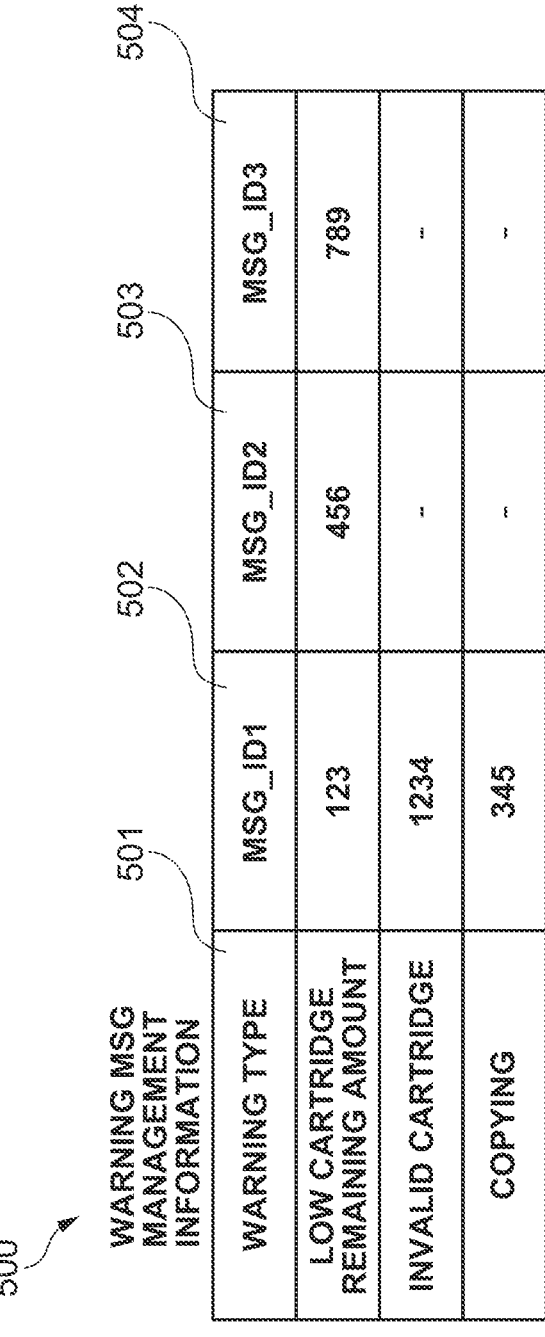
FIG. 5 is a diagram illustrating an example of warning message (MSG) management information according to the first exemplary embodiment.

FIG. 5 is a diagram illustrating an example of the warning MSG management information 500 according to the present exemplary embodiment. The warning MSG management information 500 includes a warning type 501, an MSG_ID 1 (502), an MSG_ID 2 (503), and an MSG_ID 3 (504). The warning type 501 indicates a type of state that can be caused in the image forming apparatus 101. For example, a state of a "low cartridge remaining amount" is associated with three MSG_IDs described as the MSG_ID 1, the MSG_ID 2, and the MSG_ID 3, which means that three MSGs are to be displayed.

The MSG_ID 1 (502), the MSG_ID 2 (503), and the MSG_ID 3 (504) are IDs of MSGs associated with warnings. Information regarding a specific MSG to be displayed as an MSG of each MSG_ID is stored in the storage 214 as MSG detailed information 600. The MSG detailed information 600 will be described below with reference to FIG. 6.

In the present exemplary embodiment, the example has been described where an upper limit of the number of MSGs associated with one warning is "3", but the upper limit of the number of MSGs associated with one warning may be larger than "3". In the present exemplary embodiment, the description will be hereinafter given of an example case where the warning of "low cartridge remaining amount" is issued as the warning type 501. Thus, the number of MSGs to be simultaneously displayed (hereinafter, will be referred to as the number of simultaneously displayed MSGs) that is calculated in step S402 becomes "3". A number of simultaneously displayed MSGs 907 is one piece of information to be managed in a warning display method 900 and is stored in the RAM 213 as the number of simultaneously displayed MSGs 907. In a case where a plurality of states is simultaneously caused, the number of simultaneously displayed MSGs 907 becomes a value obtained by adding up the numbers of MSGs associated with warnings to be issued. For example, in a case where the states of the "low cartridge remaining amount" and "copying" are simultaneously caused, the number of simultaneously displayed MSGs 907 becomes "4". The warning display method 900 will be described below with reference to FIGS. 9A and 9B.

FIG. 6 is a diagram illustrating an example of the MSG detailed information 600 according to the present exemplary embodiment. The MSG detailed information 600 at least includes information regarding an MSG_ID 601, an MSG 602, a QR code display necessity 603, a detailed condition 604, and a URL 605.

The MSG_ID 601 is an ID of a warning MSG, and the MSG 602, the QR code display necessity 603, the detailed condition 604, and the URL 605 are information associated with the ID.

The MSG 602 is an MSG (character string information) associated with the MSG_ID 601.

The QR code display necessity 603 and the detailed condition 604 are information for determining QR code display necessity associated with the MSG_ID 601. In the present exemplary embodiment, as the QR code display necessity 603, any of "display", "not display", and "display with condition" is set. Information that is set as the QR code display necessity 603 is predetermined for each MSG_ID 601. In a case where the QR code display necessity 603 is "display", a QR code is displayed together with a MSG. In a case where the QR code display necessity 603 is "not display", since a QR code needs not be displayed, a QR code is not displayed. In a case where the QR code display necessity 603 is "display with condition" and if a condition described in the detailed condition 604 is satisfied, a QR code is displayed together with a MSG. Nevertheless, if the condition described in the detailed condition 604 is not satisfied, a QR code is not displayed. This is because, while it is better to display a QR code for some MSGs, it is better to avoid displaying a QR code (there is no need to display a QR code) for the other MSGs.

For example, an MSG "cartridge delivery service is available" with an MSG_ID 789 is an MSG for recommending a cartridge delivery service to the user. Then, a QR code to be displayed together with the MSG indicates a URL of a website for signing a cartridge delivery service contract. Nevertheless, in a case where the user already has the cartridge delivery service contract, there is no need to access the website for signing the cartridge delivery service contract, thus the QR code is unnecessary. In a case where a QR code is displayed, to make the QR code easily readable, the CPU 211 performs control so that an MSG is displayed longer than in a case where a QR code is not displayed, which will be described below in detail. Thus, if a QR code is displayed, an MSG meaningless for the user is displayed for a long time. For this reason, to avoid such a situation, display and non-display of a QR code are made dynamically switchable based on the detailed condition 604. In the case where the QR code display necessity 603 is "display with condition" and if a condition described in the detailed condition 604 is satisfied, information about the cartridge delivery service contract can be acquired from a cartridge delivery management server (not illustrated) via the network 100.

An MSG "cartridge other than cartridge designated for this apparatus is attached (contact distributor or service provider)" with an MSG_ID 1234 is an MSG in which a serviceman can switch between display and non-display of a portion corresponding to "(contact distributor or service provider)". The switching can be performed in a service mode "SERVICE_SW1" a setting of which can be changed only by a serviceman (display when "SERVICE_SW1" is 1, and not display when "SERVICE_SW1" is 0). On the other hand, the URL 605 associated with the MSG_ID 1234 indicates a URL of a website on which contact information of a distributor or a service provider can be browsed.

In a case where "(contact distributor or service provider)" is displayed, the user needs to contact a distributor or a service provider. Thus, a QR code being displayed improves convenience of the user. Nevertheless, in a case where the serviceman hides "(contact distributor or service provider)" for some reason, it is undesirable that a QR code of the URL of the website on which the contact information of a distributor or a service provider can be browsed is displayed. In a case where the necessity of a QR code varies depending on a setting value of the service mode in this manner, the setting value of the service mode may be set in the detailed condition 604.

The URL 605 is character string information of a URL to be converted into a QR code in a case where the QR code needs to be displayed. The URL may be a URL of a portal website on which inside information about the image forming apparatus 101 can be browsed, such as a URL associated with an MSG_ID 123, or may be a URL of an external website, such as URLs associated with the MSG_ID 789 and the MSG_ID 1234. In the case of the portal website on which inside information can be browsed, a URL varies depending on an internet protocol (IP) address of the image forming apparatus 101. Thus, in the present exemplary embodiment, the URL 605 associated with the MSG_ID 123 includes a portion indicating "IP Address". When the URL is converted into a QR code, after the portion is replaced with an IP address of the image forming apparatus 101, the URL is converted into a QR code.

FIGS. 9A and 9B are diagrams each illustrating an example of the warning display method 900 according to the present exemplary embodiment. The warning display method 900 includes various types of information necessary for performing warning display, such as warning display content and a toggle display condition (display order and display switching timing of warnings), and is information stored in the RAM 213. The toggle display refers to display of automatically switching among a plurality of displays (messages, images, etc.) based on passage of time. The plurality of displays may be two displays or may be three or more displays. The toggle display is also referred to as switch display. The warning display method 900 at least includes a warning display order 901, an MSG_ID 902, a displayed MSG 903, warning display time 904, a QR code display necessity 905, a generated QR code image 906, the number of simultaneously displayed MSGs 907, a displayed warning number 908, and a QR code reading mode setting 909. These pieces of information are determined in the warning display processing procedure illustrated in FIG. 4 and a warning display method determination processing procedure illustrated in FIG. 7, which will be described below, held as the warning display method 900, and utilized for warning display.

The warning display order 901 indicates a warning display order, and the MSG_ID 902, the displayed MSG 903, the warning display time 904, the QR code display necessity 905, and the generated QR code image 906 are information associated therewith in this order.

The MSG_ID 902 indicates an ID of an MSG associated with the warning display order 901.

The displayed MSG 903 indicates an MSG (character string information) associated with the warning display order 901.

The warning display time 904 is associated with the warning display order 901 and indicates a time for which the associated displayed MSG 903 and the associated generated QR code image 906 are to be displayed. When the warning display time 904 elapses, the display is switched to display a next display order warning.

The QR code display necessity 905 is associated with the warning display order 901 and indicates whether a QR code needs to be displayed.

The generated QR code image 906 is associated with the warning display order 901 and indicates image information of a QR code to be displayed in a case where the QR code display necessity 905 is "display". The generation of a QR code image will be described below. In the present exemplary embodiment, the generated QR code image 906 is described as storing information which is the image data, but the generated QR code image 906 may store information about an address of a location where the image data is stored.

The number of simultaneously displayed MSGs 907 is the number of MSGs to be simultaneously displayed, which has been calculated in step S402. The number of simultaneously displayed MSGs 907 is not associated with the warning display order 901 and is used for control of the entire warning display.

The displayed warning number 908 is information indicating what number warning is currently displayed in a case where a plurality of warnings is simultaneously displayed. The displayed warning number 908 is not associated with the warning display order 901 and is used for the control of the entire warning display.

The QR code reading mode setting 909 is setting information indicating on and off of a QR code reading mode. The QR code reading mode setting 909 is not associated with the warning display order 901 and is used for the control of the entire warning display.

Figure 8:
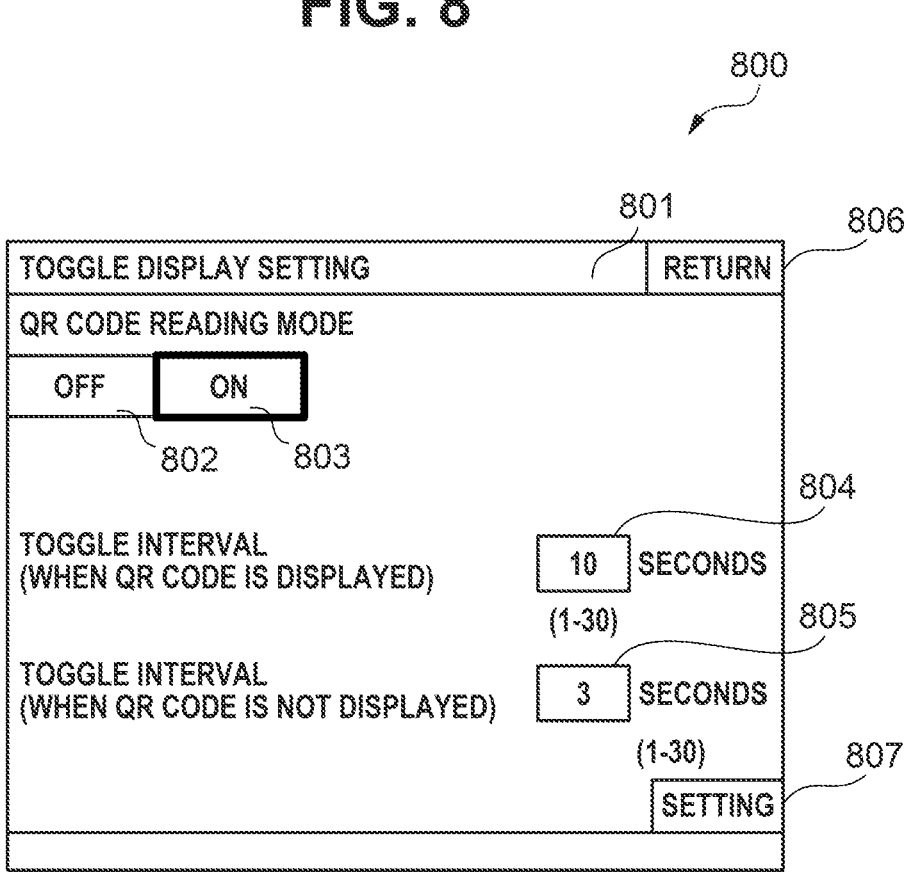
FIG. 8 is a diagram illustrating an example of a toggle display setting screen according to the first exemplary embodiment.

The QR code reading mode is a mode for performing control to display a display at a longer toggle interval in a case where a QR code is displayed than in a case where a QR code is not displayed, so that the user can easily read a QR code being displayed by toggle display. In the present exemplary embodiment, the user can set on and off of the QR code reading mode and the toggle interval in a menu setting as illustrated in FIG. 8. Instead of such a menu setting, for example, the toggle interval may be controlled using a predetermined value, such as a toggle interval of ten seconds in a case where a QR code is displayed and a toggle interval of three seconds in a case where a QR code is not displayed.

FIG. 8 is a diagram illustrating an example of a toggle display setting screen 800 according to the present exemplary embodiment.

On the toggle display setting screen 800, a toggle display setting (on and off of the QR code reading mode and a setting value of the toggle interval) can be displayed and changed. In the present exemplary embodiment, the toggle display setting is stored in the storage 214 as a part of an operation setting (not illustrated) of the image forming apparatus 101.

A setting name display region 801 is a region for displaying a setting name, and "toggle display setting" is displayed in FIG. 8.

An off button 802 is one of options of a setting value settable in the QR code reading mode. If a setting button 807 is selected in a state in which the off button 802 is selected, "OFF" (0 as the setting value in the present exemplary embodiment) is stored in the QR code reading mode.

An on button 803 is one of options of a setting value settable in the QR code reading mode.

If the setting button 807 is selected in a state in which the on button 803 is selected, "ON" (1 as the setting value in the present exemplary embodiment) is stored in the QR code reading mode. In the example illustrated in FIG. 8, the on button 803 is thick-framed, which indicates that "ON" is selected as the setting of the QR code reading mode.

A toggle interval (when QR code is displayed) 804 is a setting value indicating how many seconds a display continues before the display switches to the next display when a QR code is displayed. In the example illustrated in FIG. 8, a default value is set to "10", and a value from 1 to 30 is settable.

A toggle interval (when QR code is not displayed) 805 is a setting value indicating how many seconds a display continues before the display switches to the next display when a QR code is not displayed. In the example illustrated in FIG. 8, a default value is set to "3", and a value from 1 to 30 is settable.

In the present exemplary embodiment, the setting values of the toggle interval (when QR code is displayed) 804 and the toggle interval (when QR code is not displayed) 805 can be changed only when the on button 803 is selected. When the off button 802 is selected, the setting values are hidden or displayed in a grayout state so that the setting values cannot be changed.

If a return button 806 is selected, the toggle display setting screen 800 is closed to return to the display of a menu list screen. At this time, the toggle display setting is not changed.

If the setting button 807 is selected, the toggle display setting screen 800 is closed to return to the display of the menu list screen. At this time, the toggle display setting displayed on the toggle display setting screen 800 is stored in the storage 214.

The description returns to the description of FIG. 4.

In step S403, the CPU 211 executes warning display method determination processing. Details of the processing in step S403 will be described with reference to FIG. 7.

Figure 7:
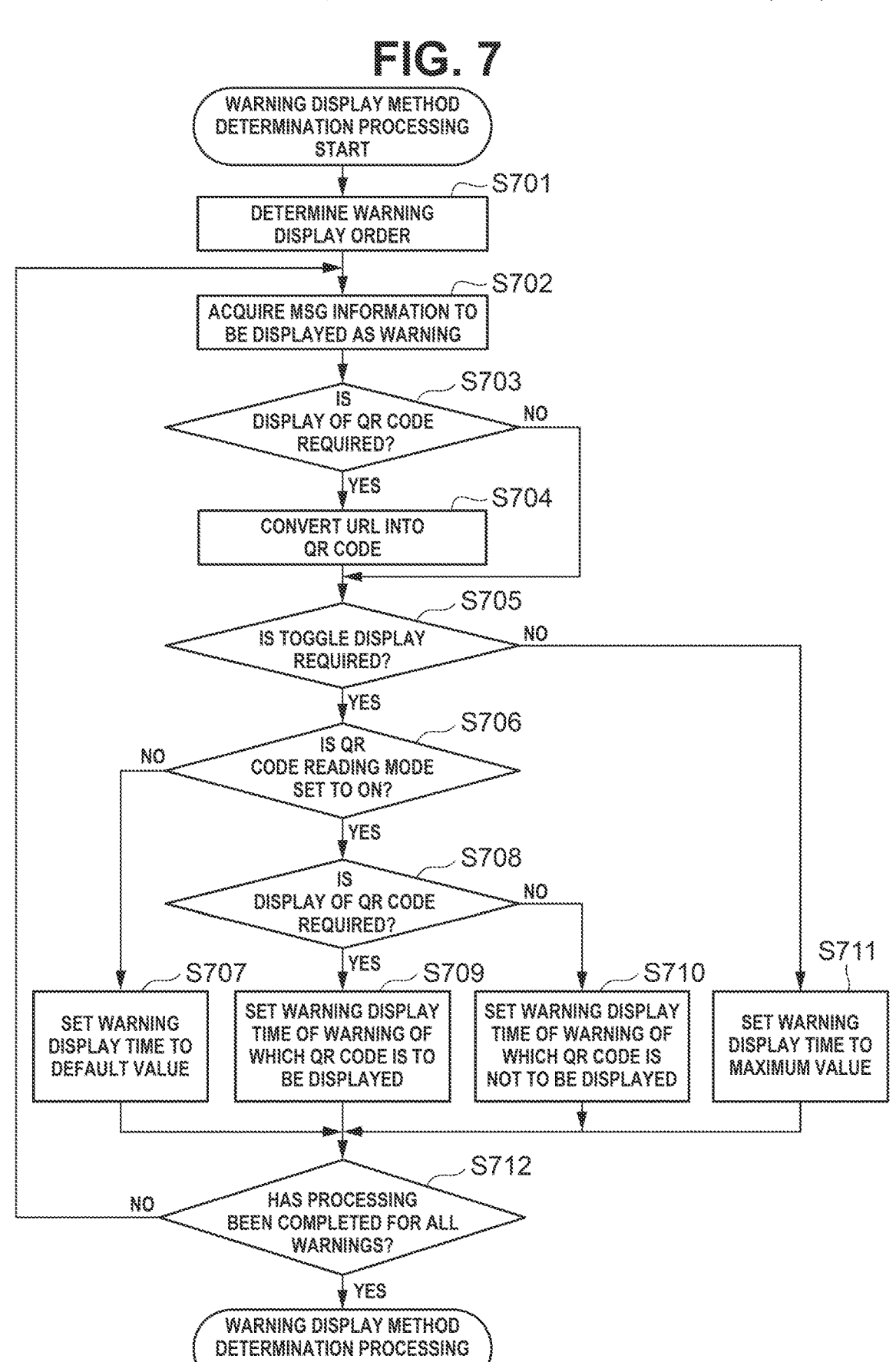
FIG. 7 is a flowchart illustrating a procedure of processing of determining a warning display method according to the first exemplary embodiment.

FIG. 7 is a flowchart illustrating a procedure of processing of determining a warning display method. Similar to the flowchart illustrated in FIG. 4, the processing illustrated in the flowchart in FIG. 7 is implemented by the CPU 211 loading a program stored in the ROM 212 or the storage 214 into the RAM 213 and executing the program.

In step S701, the CPU 211 determines a warning display order. In the present exemplary embodiment, order of definition of the warning type 501 defined in the warning MSG management information 500 directly corresponds to a priority order, and warnings are to be displayed in the order of definition. In the example illustrated in FIG. 5, the warnings are displayed in the priority order of the warning with the MSG_ID 123, the warning with an MSG_ID 456, the warning with the MSG_ID 789, the warning with the MSG_ID 1234, and the warning with an MSG_ID 345. In the present exemplary embodiment, because only the state with the "low cartridge remaining amount" is caused as the warning type 501, the CPU 211 determines that warnings are to be displayed in the order of the warning with the MSG_ID 123, the warning with the MSG_ID 456, and the warning with the MSG_ID 789. In accordance with a determination result, an MSG_ID is stored in the MSG_ID 902 in association with the warning display order 901. For example, information regarding the MSG_ID 123 is stored in the MSG_ID 902 that is first in the warning display order 901. The method for determining display order may be another method.

In step S702, the CPU 211 acquires MSG information to be displayed as a warning. The MSG information is acquired from the MSG 602 and stored in the displayed MSG 903.

In step S703, the CPU 211 determines whether display of QR code is required at the time of warning display. In a case where the QR code display necessity 603 indicates "display", or in a case where the QR code display necessity 603 indicates "display with condition" and a condition described in the detailed condition 604 is satisfied, the CPU 211 determines that the display of QR code is required. After the determination is completed, the CPU 211 stores the determination result in the QR code display necessity 905 illustrated in FIGS. 9A and 9B. In a case where the CPU 211 determines that the display of QR code is required, the CPU 211 stores information indicating that a QR code is to be "displayed", and in a case where the CPU 211 determines that the display of QR code is not required, the CPU 211 stores information indicating that a QR code is "not to be displayed".

In the case where it is determined, in step S703, that the display of QR code is not required at the time of warning display (NO in step S703), the CPU 211 advances the processing to step S705. On the other hand, in the case where the CPU 211 determines, in step S703, that the display of QR code is required at the time of warning display (YES in step S703), the CPU 211 advances the processing to step S704.

In step S704, the CPU 211 converts character string information of a URL into a QR code. First, the CPU 211 acquires character string information from the URL 605. As described above, in a case where the URL 605 includes a character string "IP Address", the CPU 211 generates character string information in which the character string is replaced with an IP address of the image forming apparatus 101. The CPU 211 instructs the conversion unit 224 to convert the generated character string information into a QR code. The CPU 211 stores image data generated by the conversion unit 224 as a QR code in the generated QR code image 906.

In step S705, the CPU 211 determines whether toggle display of warnings is required, based on the number of simultaneously displayed MSGs 907 that has been calculated in step S402. Specifically, if the number of simultaneously displayed MSGs 907 is one, the CPU 211 determines that the toggle display is not required, and if the number of simultaneously displayed MSGs 907 is a number other than one, the CPU 211 determines that the toggle display is required.

In a case where it is determined, in step S705, that the toggle display of warnings is required (YES in step S705), the processing proceeds to step S706.

In step S706, the CPU 211 checks whether the QR code reading mode is set to on. The CPU 211 acquires a toggle display setting (not illustrated) stored in the storage 214 that has been set on the toggle display setting screen 800 illustrated in FIG. 8, and checks whether the setting of the QR code reading mode that is included in the toggle display setting is "ON". In addition, the CPU 211 stores the acquired information regarding the QR code reading mode in the QR code reading mode setting 909.

In a case where it is determined, in step S706, that the QR code reading mode is not set to on (NO in step S706), the processing proceeds to step S707. In a case where it is determined, in step S706, that the QR code reading mode is set to ON (YES in step S706), the processing proceeds to step S708.

In the case where the determination in step S706 is no, the QR code reading mode is set to "OFF", and thus, in step S707, a default value is set as the warning display time 904. In the present exemplary embodiment, the default value is "3" seconds, which is the same value as the value displayed by default as the toggle interval (when QR code is not displayed) 805. The default value, however, may be a different value. In the present exemplary embodiment, the default value is also stored in the storage 214 as a part of an operation setting (not illustrated).

In step S708, the CPU 211 checks the QR code display necessity 905 and determines whether the display of QR code is required at the time of warning display.

In a case where it is determined, in step S708, that the display of QR code is required at the time of warning display (YES in step S708), the processing proceeds to step S709. In step S709, the CPU 211 sets a value set as the toggle interval (when QR code is displayed) 804 illustrated in FIG. 8 as the warning display time 904. In the example illustrated in FIG. 8, the setting value is "10" seconds.

In a case where it is determined, in step S708, that the display of QR code is not required at the time of warning display (NO in step S708), the processing proceeds to step S710. In step S710, the CPU 211 sets a value set as the toggle interval (when QR code is not displayed) 805 illustrated in FIG. 8, as the warning display time 904. In the example illustrated in FIG. 8, the setting value is "3" seconds.

In a case where it is determined, in step S705, that the toggle display of warnings is not required (NO in step S705), the processing proceeds to step S711. In step S711, the CPU 211 sets the maximum value of the toggle interval to the warning display time 904. In the example illustrated in FIG. 8, the maximum value is "30" seconds. Since the warning display needs not be switched by toggle display, a value outside of a settable range, such as "0", may be set to the warning display time 904, and if the warning display time 904 is set to "0", the CPU 211 may control display in such a manner as to continue the warning display.

In step S712, the CPU 211 checks whether the processing in steps S702 to S711 has been completed for all warnings.

In a case where it is determined, in step S712, that the processing in steps S702 to S711 has not been completed for all warnings (NO in step S712), the CPU 211 returns the processing to step S702. Then, the CPU 211 performs the processing in steps S702 to S711 on a warning with the MSG_ID 902 that is next in the display order.

On the other hand, in a case where it is determined, in step S712, that the processing in steps S702 to S711 has been completed for all the warnings (YES in step S712), the CPU 211 ends the warning display method determination processing illustrated in FIG. 7.

The description returns to the description of FIG. 4.

In step S404, the CPU 211 sets "1" as the displayed warning number 908.

In step S405, the CPU 211 instructs, via the operation unit I/F 215, the operation unit 216 to display a warning based on the warning display method determined in step S403. The CPU 211 displays, on the operation unit 216, the displayed MSG 903 of a warning with the order designated in the displayed warning number 908. At this time, if a QR code image needs to be displayed, the CPU 211 performs control to display the generated QR code image 906 and the displayed MSG 903 on the operation unit 216.

Figure 10:
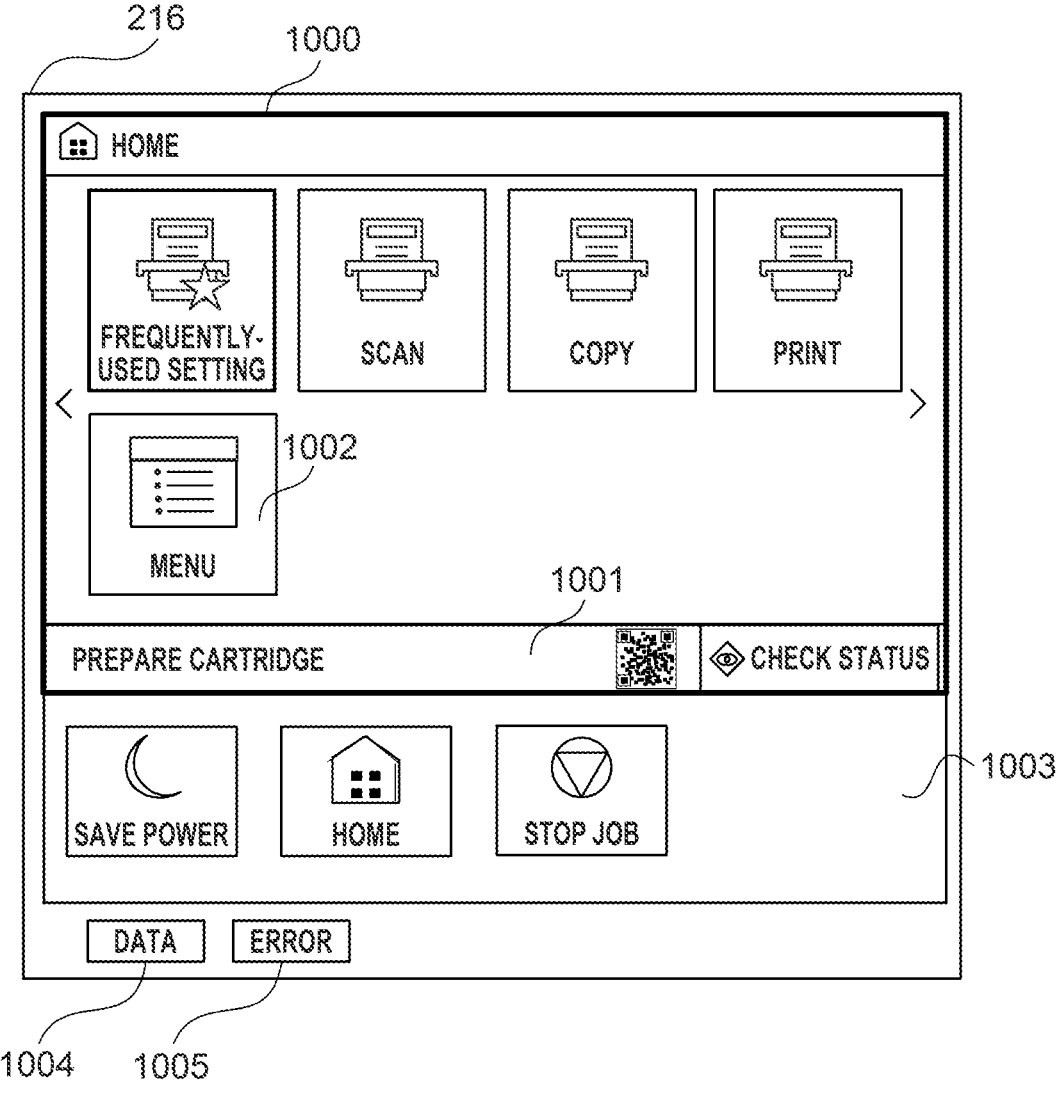
FIG. 10 is a diagram illustrating an example of an operation unit of the image forming apparatus according to the first exemplary embodiment that is displaying a warning.

When the processing in step S405 is performed for the first time, because "1" is set as the displayed warning number 908 in step S404, a warning with the warning display order 901 "1" is displayed. FIG. 10 illustrates a screen display example of the operation unit 216 to be displayed at this time.

FIG. 10 is a diagram illustrating an example of the operation unit 216 of the image forming apparatus 101 according to the present exemplary embodiment that is displaying a warning.

The operation unit 216 includes a touch panel 1000 (defined by a thick frame), a hardware key region 1003, a data light-emitting diode (LED) 1004, and an error LED 1005.

On the touch panel 1000 illustrated in FIG. 10, a home screen of the image forming apparatus 101 that is displayed when the warning of the "low cartridge remaining amount" is issued is displayed.

The home screen is a screen for issuing an instruction for executing each function of the image forming apparatus 101. Touch images for functions to be executed by the image forming apparatus 101, such as a frequently-used setting, scan, copy, print, a menu 1002, and a status check are displayed on the home screen. A warning display region 1001 is also displayed. In the example illustrated in FIG. 10, the warning display region 1001 is a status line of the home screen. The status line has a display width corresponding to a single-line character string, and a QR code is displayed therein. Nevertheless, the status line is not limited to this. The status line may have a display width corresponding to a character string on two or more lines.

The warning display region 1001 is a region for displaying a warning, and a warning MSG and a QR code are displayed. Since a warning with the warning display order "1" is displayed in this example, "prepare cartridge" is displayed as the displayed MSG 903, and a QR code image 1 is displayed together. The CPU 211 controls the operation unit 216 to continue to display the display for ten seconds as designated in the warning display time 904. In the present exemplary embodiment, the warning display region 1001 changes by toggle display. Nevertheless, the warning display region 1001 may correspond to the entire touch panel 1000, and the entire touch panel 1000 may change by toggle display.

The menu 1002 is a touch image for executing various settings of the image forming apparatus 101 and report printing. If the menu 1002 is pressed, various settings and a list of executable operations are displayed. The toggle display setting exists in the list, and the toggle display setting screen 800 is a screen to be displayed when the "toggle display setting" is further selected from the list in the menu 1002.

The hardware key region 1003 is a region in which hardware keys are arranged. In the present exemplary embodiment, three hardware keys corresponding to power saving, home, and stop are arranged. The detailed description of the function of each key will be omitted.

The data LED 1004 and the error LED 1005 notify the user of the state of the image forming apparatus 101.

The data LED 1004 lights up while an e-mail or file transmission job is being executed, and the error LED 1005 lights up when an error of some sort has occurred in the image forming apparatus 101.

The description returns to the description of FIG. 4.

In step S406, the CPU 211 determines whether a warning display end condition has been satisfied during the warning display executed in step S405. The warning display end condition is a condition under which the screen display of the operation unit 216 is to be ended. For example, the warning display end condition includes a condition that the image forming apparatus 101 has not been used for a predetermined time and has transitioned to a power saving state, and a condition that the user has turned the power of the image forming apparatus 101 off. In the present exemplary embodiment, the determination in step S406 is made during the warning display executed in step S405. Alternatively, the determination in step S406 may be made after the warning display in step S405 is completed.

In a case where it is determined, in step S406, that the warning display end condition has been satisfied (YES in step S406), the CPU 211 advances the processing to step S410. On the other hand, in a case where it is determined in step S406 that the warning display end condition has not been satisfied (NO in step S407), the CPU 211 advances the processing to step S410.

In step S407, the CPU 211 determines whether all warnings have been displayed. In the case of the example illustrated in FIG. 9A, the CPU 211 determines whether the display has ended up to the warning display order "3". Specifically, the CPU 211 determines whether the displayed warning number 908 is "3".

In a case where it is determined, in step S407, that all the warnings have been displayed (YES in step S407), the CPU 211 advances the processing to step S408. On the other hand, in a case where it is determined, in step S407, that all the warnings have not been displayed (NO in step S407), the CPU 211 advances the processing to step S409.

In step S408, the CPU 211 determines whether a warning issuance situation has changed. For example, in a case where copy is executed in the state of "low cartridge remaining amount" and an additional display of "copying" becomes necessary, the CPU 211 determines that the warning issuance situation has changed.

In a case where it is determined, in step S408, that the warning issuance situation has not changed (NO in step S408), the CPU 211 advances the processing to step S409. On the other hand, in a case where it is determined, in step S408, that the warning issuance situation has changed (YES in step S408), the CPU 211 advances the processing to step S410.

In step S409, the CPU 211 sets a "next display order value" as the displayed warning number 908 and returns the processing to step S405. In a case where the displayed warning number 908 is smaller than the number of simultaneously displayed MSGs 907 which is "3", the "next display order value" becomes a "value corresponding to a present value+1" (2 if the present value is 1). In a case where the displayed warning number 908 is "3", which is the same as the number of simultaneously displayed MSGs 907, the CPU 211 sets "1". With this configuration, in step S405, a warning that is next in the display order can be displayed. After all the warnings have been displayed, the CPU 211 returns the processing to the initial warning display again.

By repeating the processing in steps S405 to S409, all the warnings set in the warning display method 900 can be displayed in order from the first warning. In the present disclosure, the order control method of toggle display, and a change method and an end method of the warning display are merely examples, and the present disclosure is also applicable to a case where order control is performed using another method. For example, in the present exemplary embodiment, after it is determined, in step S407, that the display of all the warnings to be displayed by toggle display has ended, in step S408, it is checked whether the warning issuance situation has changed, and in a case where the warning issuance situation has changed, the warning display processing is ended. By reversing the processing order of steps S407 and S408, in a case where the warning issuance situation has changed before all the warnings are displayed, the warning display processing can be promptly ended, and the warning display can switch to a warning display in a new state.

In a case where the processing proceeds from step S408 to step S410, the CPU 211 clears the warning display method 900 (i.e., all information regarding the toggle display condition and warning display content).

If the CPU 211 clears the warning display method 900 in step S410, the CPU 211 ends the warning display processing.

With this configuration, it is possible to execute the processing from step S401 in the same state when the warning display processing restarts next time. For example, in a case where copy is executed in the "low cartridge remaining amount" state and the additional display of "copying" becomes necessary in step S408, by performing the processing in steps S401 to S403 again, the warning display method 900 can be reset as illustrated in FIG. 9B, and warning display can be performed.

With the above-described configuration, by performing control in such a manner as to perform display at a different toggle interval depending on the presence or absence of a QR code, it is possible to enable the user to easily read the QR code in the case a QR code is displayed during toggle display.

The present disclosure is also applicable to a case where a warning is displayed by flow display instead of toggle display. In the case of the flow display, the number of simultaneously displayed MSGs 907 is to be set to "1", and after the displayed MSG 903 is displayed by flow display in step S405, the QR code image 1 is to be displayed in a fixed manner for the time set as the warning display time 904.

In the first exemplary embodiment, the description has been given of a method of performing screen display control in such a manner that a QR code can be easily read, by elongating a toggle interval during QR code display using the QR code reading mode setting 909 and the warning display time 904.

In a second exemplary embodiment, a description will be given of a method of providing a QR code reading button on the operation unit 216 and performing screen display control in such a manner that the user can easily execute QR code reading when the user presses the QR code reading button.

Figure 11:
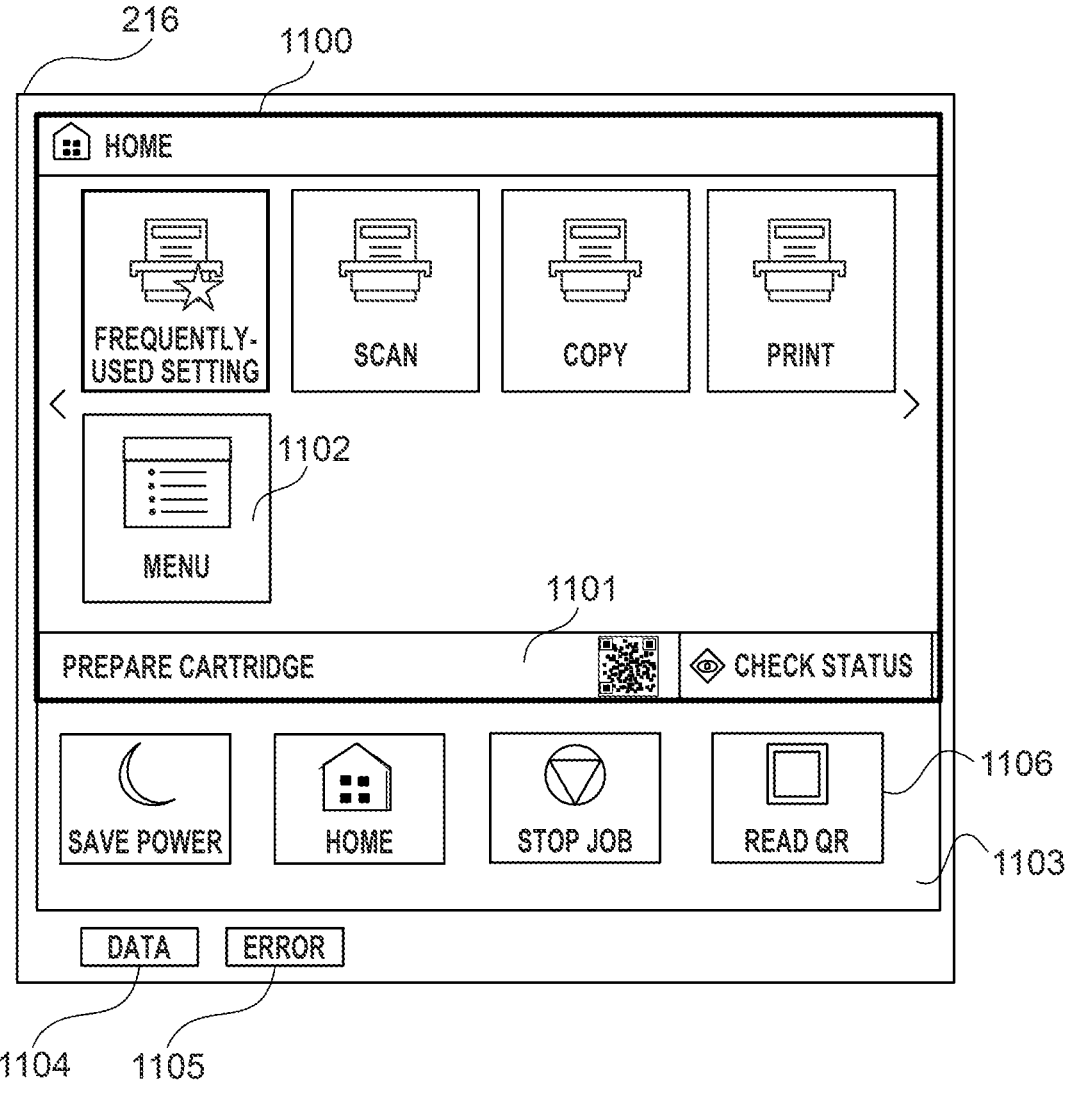
FIG. 11 is a diagram illustrating an example of an operation unit of an image forming apparatus according to a second exemplary embodiment that is displaying a warning.

FIG. 11 is a diagram illustrating an example of the operation unit 216 of the image forming apparatus 101 according to the present exemplary embodiment that is displaying a warning.

A difference between FIGS. 11 and 10 lies in that a QR code reading button 1106 is added in FIG. 11. Since the display of other components 1100 to 1105 is the same as the display of the components 1000 to 1005 illustrated in FIG. 10, the description thereof will be omitted.

The QR code reading button 1106 is a hardware key (button) arranged in the hardware key region 1103. While, in the present exemplary embodiment, the QR code reading button 1106 is described as a hardware key, by displaying a QR code reading button on the touch panel 1100, a similar function may be implemented by a software key.

In the present exemplary embodiment, if the user presses the QR code reading button 1106 while a QR code is being displayed, it is determined that the user has an intention of reading the QR code, and display control is performed so that the screen displaying the QR code is held (toggle display is not performed). Hereinafter, a state in which display control is performed will be referred to as a state in which a toggle display stop mode 1310 is set to on. If the user presses the QR code reading button 1106 again, it is determined that QR code reading has been completed. The toggle display is restarted, and the toggle display stop mode 1310 is set to off. A warning display method 1300 including the toggle display stop mode 1310 will be described below with reference to FIG. 13.

In a case where a QR code reading button is provided as a software key, instead of a QR code reading button that is explicitly provided, control may be performed so that the entire touch panel 1100 serves as a QR code reading button. More specifically, control may be performed so that, if the user touches the touch panel 1100 during QR code display, the toggle display is stopped, and if the user touches the touch panel 1100 again, the toggle display is restarted.

Alternatively, in a case where the user presses the QR code reading button 1106, a mode shifts to the QR code reading mode as in the first exemplary embodiment, and a QR code is displayed, control may be performed so as not to perform toggle display for ten seconds, for example. In this case, if the user presses the QR code reading button 1106, the QR code reading mode setting 909 is set to on, and the warning display time 904 for an MSG of which the QR code display necessity 905 indicates "display" is set to "10" seconds. With this configuration, display control can be performed using the same method as the method described in the first exemplary embodiment with reference to FIG. 4. If the user presses the QR code reading button 1106 in this state, the QR code reading mode setting 909 is set to off, and the warning display time 904 for all MSGs is set to "3" seconds, and thus the display returns to normal display. Furthermore, in this case, unlike the first exemplary embodiment, since the user has not designated the warning display time 904 by himself/herself, it is difficult for the user to know for how many seconds the display is to be provided. Thus, a time until toggle display stop is cancelled may be displayed in a countdown manner.

FIG. 13 is a diagram illustrating an example of the warning display method 1300 according to the second exemplary embodiment. Because components 1301 to 1309 are the same as the components 901 to 909 illustrated in FIGS. 9A and 9B, the description thereof will be omitted. A difference from the first exemplary embodiment lies in that the warning display time 1304 does not change from the default value of "3" seconds, and the QR code reading mode setting 1309 is always set to off. In the present exemplary embodiment, these are not used, and instead, warning display control is performed in the toggle display stop mode 1310.

The details of the warning display control will be described with reference to FIG. 12.

Figure 12:
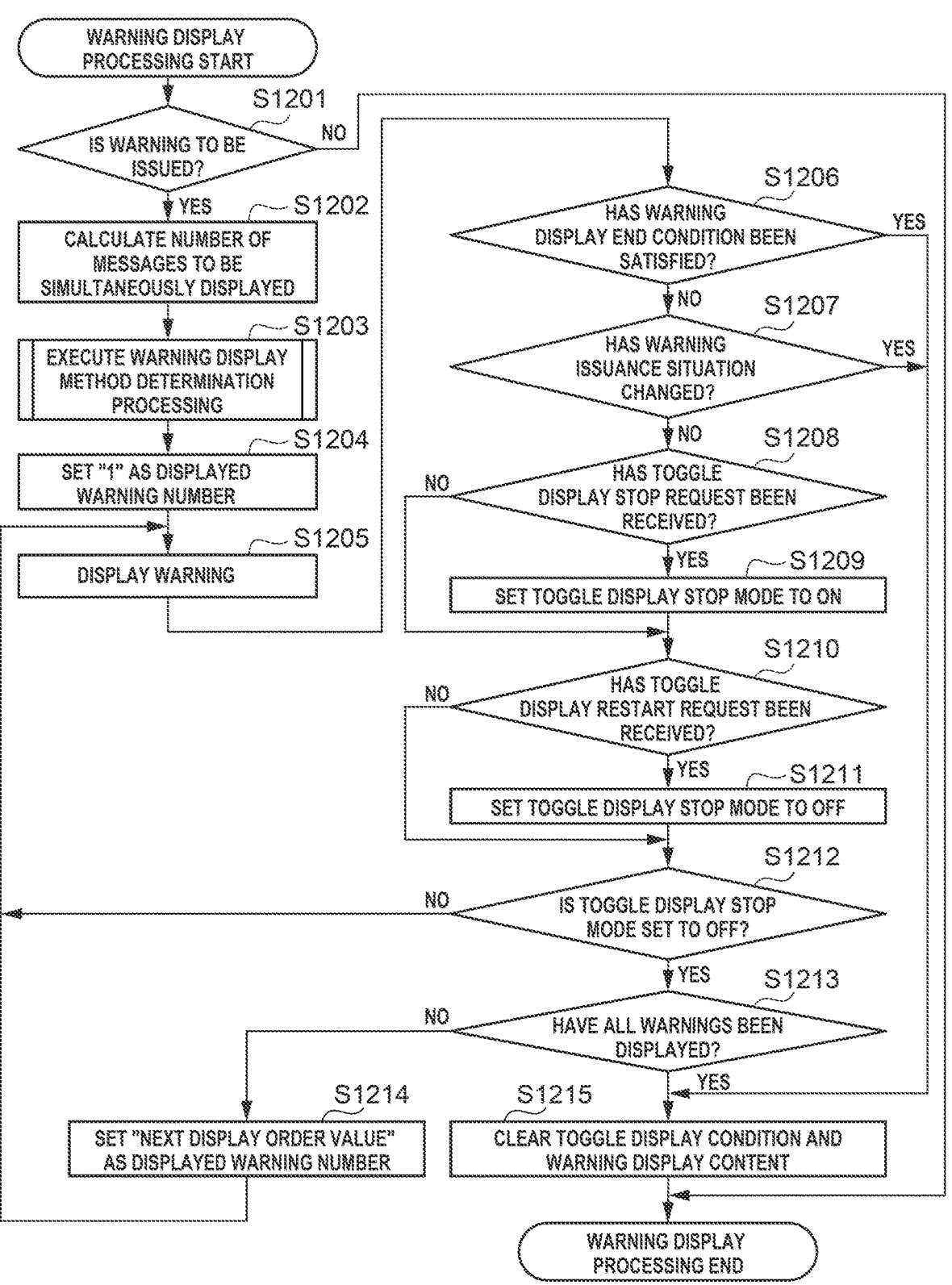
FIG. 12 is a flowchart illustrating a procedure of processing of displaying a warning on an operation unit of an image forming apparatus according to the second exemplary embodiment.

FIG. 12 is a flowchart illustrating a procedure of processing of warning display on the operation unit 216 of the image forming apparatus 101 according to the present exemplary embodiment. The processing illustrated in the flowchart in FIG. 12 is implemented by the CPU 211 loading a program stored in the ROM 212 or the storage 214 into the RAM 213 and executing the program.

Because the processing in steps S1201 to S1206 is the same as the processing in steps S401 to S406 of FIG. 4, the description thereof will be omitted.

In step S1207, the CPU 211 determines whether a warning issuance situation has changed. The processing is the same as the processing in step S408 of FIG. 4. Nevertheless, to once end warning processing in a case where the warning issuance situation has changed when the toggle display stop mode 1310 is set to on, and restart the warning processing, unlike the procedure illustrated in FIG. 4, the determination in step S1207 is made earlier than the determination in step S1213 (corresponding to step S407 of FIG. 4).

In a case where it is determined, in step S1207, that the warning issuance situation has not changed (NO in step S1207), the CPU 211 advances the processing to step S1208. In a case where it is determined, in step S1207, that the warning issuance situation has changed (YES in step S1207), the CPU 211 advances the processing to step S1215.

In step S1208, the CPU 211 determines whether a toggle display stop request has been received via the operation unit 216. In the present exemplary embodiment, the toggle display stop request corresponds to a press of the QR code reading button 1106 that is executed when the toggle display stop mode 1310 is set to off.

In the case of the example in which the entire touch panel 1100 serves as the QR code reading button, the toggle display stop request corresponds to a touch on the touch panel 1100 that is executed when the toggle display stop mode 1310 is set to off.

In a case where it is determined, in step S1208, that the toggle display stop request has been received (YES in step S1208), the CPU 211 advances the processing to step S1209. In step S1209, the CPU 211 sets the toggle display stop mode 1310 to on. On the other hand, in a case where it is determined, in step S1208, that the toggle display stop request has not been received (NO in step S1208), the CPU 211 advances the processing to step S1210.

In step S1210, the CPU 211 determines whether a toggle display restart request has been received via the operation unit 216. In the present exemplary embodiment, the toggle display restart request corresponds to a press of the QR code reading button 1106 that is executed when the toggle display stop mode 1310 is set to on. In the case of the example in which the entire touch panel 1100 serves as the QR code reading button, the toggle display restart request corresponds to a touch on the touch panel 1100 that is executed when the toggle display stop mode 1310 is set to on.

In a case where a URL obtained by reading a QR code indicates a portal website of the image forming apparatus 101 as in the case of the URL 605 associated with the MSG_ID 123 illustrated in FIG. 6, when the information processing apparatus 104 displays the portal website, the image forming apparatus 101 receives a display content transmission request. The reception of the display content transmission request can be regarded as meaning that the user has completed QR code reading. Thus, in a case where the display content transmission request of the portal website is received when the toggle display stop mode 1310 is set to on, the display content transmission request may be handled as a toggle display restart request (it may be determined in step S1210 that the toggle display restart request has been received (YES in step S1210)).

In a case where it is determined, in step S1210, that the toggle display restart request has been received (YES in step S1210), the CPU 211 advances the processing to step S1211. In step S1211, the CPU 211 sets the toggle display stop mode 1310 to off. On the other hand, in a case where it is determined, in step S1210, that the toggle display restart request has not been received (NO in step S1210), the CPU 211 advances the processing to step S1212.

In step S1212, the CPU 211 checks whether the toggle display stop mode 1310 is set to off.

In a case where it is checked, in step S1212, that the toggle display stop mode 1310 is not set to off (NO in step S1212), since the toggle display stop mode 1310 is set to on, the CPU 211 advances the processing to step S1205, and causes the operation unit 216 to continue the same warning display. By performing the processing in steps S1205 to S1212 in this manner, in the case where the toggle display stop mode 1310 is set to on, the same warning display is continued except in a case where a condition under which display needs to be changed is satisfied.

Because the processing in step S1213 is the same as the processing in step S407 of FIG. 4, and the processing in steps S1214 and S1215 is the same as the processing in steps S409 and S410 of FIG. 4, the description thereof will be omitted.

With the above-described configuration, it is possible to perform screen display control in such a manner that the user can easily execute QR code reading using the QR code reading button 1106 on the operation unit 216.

In the above-described exemplary embodiments, the description has been given using a two-dimensional code as an example, but a barcode or the like may be used as long as character string information can be acquired by reading and analyzing a code using a camera.

In the above-described exemplary embodiments, a warning of a low toner remaining amount of a toner cartridge has been described as an example of display, but a warning to be displayed is not limited to this. For example, a warning to be displayed may be a warning indicating a paper jam of a document in the reading unit 218, a warning indicating a jam on a conveyance path of sheets fed for printing in the printing unit 220, or a warning indicating that a free area in the storage 304 has fallen below a predetermined amount. As an example of display, a notification indicating the state of the image forming apparatus 101, such as a notification indicating that a sheet feeding cassette for the print function is open, or a notification indicating that image data generated by reading an image on a document is to be converted into an e-mail, may be issued. Alternatively, a notification may be another advertisement.

In the above-described exemplary embodiments, the description has been given of the example in which display is performed in the warning display region 1001 (status line) on the home screen, but a display location is not limited to this. Display may be performed on a status line of a copy screen that is a top screen of the copy function. In a case where a plurality of displays is automatically switched based on time passage, display may be performed on a normal display screen or a popup screen instead of the status line.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-188902, filed Nov. 28, 2022, which is hereby incorporated by reference herein in its entirety.

What is claimed is:

1. An image processing apparatus comprising:
   a display that displays a plurality of screens including:
      a first screen displayed on the basis that the image processing apparatus is in an error state, the first screen including a predetermined code, and
      a second screen displayed on the basis that the image processing apparatus is not in the error state but in a processing state, the second screen not including the predetermined code,
      wherein the plurality of screens being automatically switched in order; and
   a controller that controls the display in such a manner that the first screen is displayed longer than the second screen among the plurality of screens.

2. The image processing apparatus according to claim 1, wherein the controller selects a first mode in which the first screen is displayed longer than the second screen, and a second mode in which the first screen is displayed for a same time as the second screen,
   wherein, in a case where the first mode is selected, the controller controls the display in such a manner that the first screen is displayed longer than the second screen, and
   wherein, in a case where the second mode is selected, the controller controls the display in such a manner that the first screen is displayed for a same time as the second screen.

3. The image processing apparatus according to claim 1, wherein, based on the first screen including the predetermined code, the controller controls the display in such a manner that the first screen is displayed longer than the second screen.

4. The image processing apparatus according to claim 1, wherein the controller receives a display time of the first screen and a display time of the second screen,
   wherein, based on the display time of the first screen and the display time of the second screen that have been received by the controller, the controller controls the display in such a manner that the first screen is displayed longer than the second screen.

5. The image processing apparatus according to claim 1, wherein the first screen indicates that the image processing apparatus is in the error state, and the second screen indicates that the image processing apparatus is in the processing state.

6. The image processing apparatus according to claim 1, wherein the error state is a state in which a value has fallen below a predetermined threshold value.

7. The image processing apparatus according to claim 1, wherein the processing state is a state in which a job is being executed.

8. The image processing apparatus according to claim 1, wherein the predetermined code is a two-dimensional code.

9. The image processing apparatus according to claim 1, wherein the predetermined code is a barcode.

10. A control method of an image processing apparatus, the control method comprising:

displaying a plurality of screens including a first screen displayed on the basis that the image processing apparatus is in an error state, the first screen including a predetermined code, and a second screen displayed on the basis that the image processing apparatus is not in the error state but in a processing state, the second screen not including the predetermined code, the plurality of screens being automatically switched in order; and performing control in such a manner that the first screen is displayed longer than the second screen among the plurality of screens.

11. The control method of an image processing apparatus according to claim 10, further comprising:

selecting a first mode in which the first screen is displayed longer than the second screen, and a second mode in which the first screen is displayed for a same time as the second screen, wherein, in a case where the first mode is selected, control is performed in such a manner that the first screen is displayed longer than the second screen, and wherein, in a case where the second mode is selected, control is performed in such a manner that the first screen is displayed for a same time as the second screen.

12. The control method of an image processing apparatus according to claim 10, wherein, based on the first screen including the predetermined code, control is performed in such a manner that the first screen is displayed longer than the second screen.

13. The control method of an image processing apparatus according to claim 10, further comprising receiving a display time of the first screen and a display time of the second screen, wherein, based on the display time of the first screen and the display time of the second screen that have been received in the receiving, control is performed in such a manner that the first screen is displayed longer than the second screen.

14. The control method of an image processing apparatus according to claim 10, wherein the first screen indicates that the image processing apparatus is in the error state, and the second screen indicates that the image processing apparatus is in the processing state.

15. The control method of an image processing apparatus according to claim 10, wherein the error state is a state in which a value has fallen below a predetermined threshold value.

16. The control method of an image processing apparatus according to claim 10, wherein the processing state is a state in which a job is being executed.

17. The control method of an image processing apparatus according to claim 10, wherein the predetermined code is a two-dimensional code.

18. The control method of an image processing apparatus according to claim 10, wherein the predetermined code is a barcode.

19. A non-transitory computer readable storage medium storing a program for causing a computer to execute a control method of an image processing apparatus, the control method comprising:

displaying a plurality of screens including a first screen displayed on the basis that the image processing apparatus is in an error state, the first screen including a predetermined code, and a second screen displayed on the basis that the image processing apparatus is not in the error state but in a processing state, the second screen not including the predetermined code, the plurality of screens being automatically switched in order; and performing control in such a manner that the first screen is displayed longer than the second screen among the plurality of screens.

* * * * *